United States Patent [19]

Warren et al.

[11] Patent Number: 5,128,403

[45] Date of Patent: Jul. 7, 1992

[54] HIGH-TEMPERATURE ADHESIVE COMPOSITIONS

[75] Inventors: Patrick A. Warren, Erie; Mark A. Weih, Cambridge Springs; Karen M. Bond, Edinboro, all of Pa.

[73] Assignee: Lord Corporation, Erie, Pa.

[21] Appl. No.: 683,219

[22] Filed: Apr. 10, 1991

[51] Int. Cl.$^5$ ............ C08K 3/22; C08K 5/13; C08K 5/02; C08L 27/24

[52] U.S. Cl. ............ 524/430; 524/346; 524/364; 524/551; 524/323; 525/288; 525/292; 525/297; 525/511

[58] Field of Search ............ 524/346, 364, 430, 551, 524/323; 525/288, 292, 297, 276, 511

[56] References Cited

U.S. PATENT DOCUMENTS

| | | | |
|---|---|---|---|
| 3,258,388 | 6/1966 | Coleman et al. | 161/218 |
| 3,258,389 | 6/1966 | Coleman et al. | 161/218 |
| 3,640,941 | 2/1971 | Findley et al. | 260/33.6 A |
| 3,778,406 | 12/1973 | Klötzer et al. | 524/430 |
| 4,442,163 | 4/1984 | Kühner et al. | 524/346 |
| 4,782,106 | 11/1988 | Fricke et al. | 524/430 |
| 4,795,778 | 1/1989 | Bond et al. | 524/551 |

Primary Examiner—Paul R. Michl
Assistant Examiner—Peter Szekely
Attorney, Agent, or Firm—W. Graham Buie

[57] ABSTRACT

A one-coat adhesive composition which utilizes environmentally acceptable ingredients and which can withstand high temperature conditions such as those experienced during injection molding processes. The adhesive contains a Diels-Alder adduct of a perhalogenated cyclic conjugated diene and an olefinically unsaturated dienophile having a vinyl content in excess of 50 percent, a phenolic resin, an aromatic hydroxy compound, a formaldehyde donor, a heat-activated unsaturated elastomer crosslinker, a vulcanizing agent, and a metal oxide. An adhesive bond prepared with the adhesive is resistant to high temperature fluids and corrosive agents.

29 Claims, No Drawings

HIGH-TEMPERATURE ADHESIVE COMPOSITIONS

FIELD OF THE INVENTION

The present invention relates to compositions of matter which are useful for bonding substrates or surfaces of various materials. More specifically, the present invention relates to an environmentally acceptable adhesive composition which is capable of withstanding high temperatures and which contains, inter alia, a Diels-Alder adduct and a phenolic resin.

BACKGROUND OF THE INVENTION

Over the years, many adhesive compositions have been developed for bonding various materials or objects such as elastomeric substrates and metal surfaces. As bonding technology continues to develop, adhesive compositions are being exposed to increasingly demanding bonding conditions while the range of ingredients utilized in adhesive compositions is continually being circumscribed by environmental regulations. In order to fare well in this somewhat dilemmatic atmosphere, future adhesive compositions will need to utilize environmentally acceptable components which result in adhesive materials capable of withstanding relatively severe bonding conditions.

One example of increasing severity of bonding conditions can be found in the increasingly popular injection mold bonding process. Injection mold bonding is effective since production can be increased due to the use of higher cure temperatures and shorter cure times and since the rubber/metal bonding process can be automated. However, injection molding processes are carried out at high temperatures (320°-350° F.) which can interfere with the bonding effectiveness of the adhesive composition utilized in the process.

Examples of previously developed adhesive composition can be found in U.S. Pat. Nos. 3,258,388 and 3,258,389. These rubber-to-metal adhesive compositions are described as utilizing a nitroso aromatic compound as a type of crosslinker which enhances adhesion to the rubber substrate. While these adhesive compositions are effective for bonding rubber to metal under many types of conditions, it has been found that the aromatic nitroso compound tends to sublime at the higher temperatures currently experienced in injection molding processes. This sublimation can cause the incoming rubber to react with the aromatic nitroso compound and to be cured before it has a chance to fill the injection mold cavities and react with the adhesive on the metal surface. The pre-cured rubber will not mix with the rest of the rubber in the mold, resulting in the formation of weak boundary layers that can lead to premature failure in the cured article. These adhesives, as well as many other adhesive systems, are also somewhat disadvantageous in that they typically require the application of two coats of material, such as a primer and an overcoat, in order to obtain sufficient adhesion.

An attempt to develop an adhesive composition free of aromatic nitroso compounds is disclosed in U.S. Pat. No. 3,640,941. This adhesive composition utilizes a graft polymer of polybutadiene and substituted cyclopentadiene monomer, dibasic lead phosphite, resorcinol, and a solvent. While this composition avoids the use of aromatic nitroso compounds, it requires the utilization of a lead-containing compound which can be detrimental to the environment and hazardous to the health of persons handling the adhesive composition.

A one-coat adhesive composition is needed that will utilize nontoxic, environmentally acceptable components as well as withstand increasingly demanding bonding conditions such as those experienced during injection molding processes. Such an adhesive composition should also produce an adhesive bond that will resist exposure to adverse environments such as high temperature fluids and corrosive agents.

SUMMARY OF THE INVENTION

The present invention is a one-coat adhesive composition which predominantly utilizes environmentally acceptable components and which can withstand elevated temperature bonding conditions. An adhesive bond prepared with the present adhesive composition also exhibits excellent resistance to high temperature fluid environments and corrosive conditions. The present adhesive composition contains a Diels-Alder adduct of a perhalogenated cyclic conjugated diene and an olefinically unsaturated dienophile having a vinyl content in excess of 50 percent, a phenolic resin, an aromatic hydroxy compound, a formaldehyde donor, a heat-activated unsaturated elastomer crosslinker, a vulcanizing agent and a metal oxide. It has been presently discovered that this particular combination of environmentally acceptable ingredients will result in an adhesive composition that can be applied as a one-coat composition and that will withstand high temperature environments such as those experienced during injection molding processes. The invention, in its preferred embodiment, avoids the use of both aromatic nitroso compounds and lead compounds which have previously caused difficulties in adhesive compositions as described above.

DETAILED DESCRIPTION OF THE INVENTION

The Diels-Alder adduct of the present invention is formed by reacting at least one halogenated cyclic conjugated diene and at least one polyalkadiene dienophile having a high vinyl content. The vinyl content is the proportion of polydiene units bounded together in the 1,2-mode of addition to form pendant vinyl groups and is quantitatively determined by infrared absorption spectroscopy at 11.0 microns, using a solution of approximately 2.5 grams of polymer in 100 milliliters of anhydrous carbon disulfide. The Diels-Alder adducts have a halogen content in the range from about 20 to 40, preferably about 26 to 35 weight percent based on the total weight of adduct material.

The Diels-Alder adducts of this invention comprise the adduct of at least one halogenated cyclic conjugated diene and at least one polyalkadiene dienophile having a high vinyl content. The polyalkadiene is more particularly characterized by a vinyl content of at least 50 percent, preferably of at least 70 percent, and most preferably is in the range from 88 to 98 percent, based on total olefinic unsaturation.

The halogenated cyclic conjugated dienes which are employed in forming the adducts for use in this invention have the formula

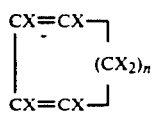

wherein X is a halogen selected from the group consisting of chlorine, bromine and fluorine, with chlorine being currently preferred and n being 1, 2 or 3, preferably 1. The halogenated cyclic dienes are readily prepared by well-known methods and at least one, hexachlorocyclopentadiene, is a wellknown article of commerce. Other representative dienes include hexafluorocyclopentadiene, hexabromocyclopentadiene, 5,5-difluorotetrachlorocyclopentadiene and 5,5-dibromotetrachlorocyclopentadiene. Hexachlorocyclopentadiene is presently preferred for use in the present invention.

The polyalkadiene dienophiles which are reacted with the halogenated cyclic conjugated dienes to form the adducts which are employed in the adhesive compositions of this invention are, as noted, characterized by a vinyl content of at least 50 percent. The dienophiles are further characterized by having an elongated backbone carbon chain which is characterized by the presence of a predominant amount of pendant nonterminal vinyl groups attached to alternating carbon atoms of the backbone of the polyalkadiene to provide the structure

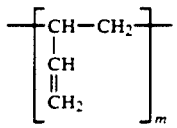

wherein m is a measure of the degree of polymerization and is typically an integer between 10 and 4,000. As noted, the vinyl groups constitute at least 50 percent, preferably 70 to 98 percent and especially 88 to 98 percent, of the residual olefinic unsaturation of the dienophile. The polyalkadiene dienophiles are further characterized by having molecular weights in the range from 500 to 200,000, preferably 10,000 to 120,000 and most preferably 35,000 to 120,000. Thus, it will be seen that the polyalkadiene dienophiles which can be employed in the practice of this invention include liquid polymers and solid gum polymers.

The polyalkadiene materials which are suitable for use in forming the adhesive compositions described herein are polymeric materials selected from the group consisting of polyalkadienes, hydroxyl-terminated polyalkadienes, chain-extended hydroxyl-terminated polyalkadienes, carboxyl-terminated polyalkadienes, chain-extended carboxyl-terminated polyalkadienes, mercaptan-terminated polyalkadienes, chain-extended mercaptan-terminated polyalkadienes, amine-terminated polyalkadienes, chain-extended amine-terminated polyalkadienes, and their equivalents. Where used in this specification and claims, the term "polyalkadiene" is understood to refer to polymers of at least one conjugated diene having from 4 to 12 carbon atoms and includes copolymers of at least one such conjugated diene and at least one other monomer copolymerizable therewith. As noted, the polyalkadienes can be unmodified, e.g., polybutadiene, random copolymers of poly(butadiene-styrene), and the like; or modified, as by having hydroxyl or carboxyl termination and including chain-extended hydroxyl-terminated and carboxyl-terminated polymeric materials. The polyalkadienes can also be the block copolymers of styrene and butadiene as disclosed in co-pending application Ser. No. 07/657,929 filed Feb. 20, 1991, entitled "Adhesive Compositions Based on Block Copolymer Adducts," which is incorporated herein by reference. As noted, the polyalkadienes can be either liquid polymers or solid gum polymers. In this regard, the hydroxyl-substituted, carboxyl-substituted, amine-substituted and mercaptan-substituted polyalkadienes as produced by the majority of the present commercial polymerization processes generally are liquid polymers having molecular weights in the range of about 500 to about 20,000; with the bulk of such substituted polyalkadienes having molecular weights in the range of about 750 to about 3,000. Thus, it will be appreciated that the hydroxyl-, carboxyl-, amine- and mercaptan-substituted polyalkadienes will normally be chain-extended in order to increase their molecular weights to the ranges found most suitable in the present invention. Especially preferred dienophiles are 1,2-polybutadiene homopolymers having a vinyl content in excess of 90 percent, a molecular weight between 35,000 and 40,000 and a crystallinity between 23 and 27 percent. A description of the preparation of 1,2-polybutadiene homopolymers can be found in the *Encyclopedia of Polymer Science and Technology*, Vol. 2, John Wiley and Sons, New York, 1985, p. 573.

The hydroxyl-substituted, carboxyl-substituted, amine-substituted, and mercaptan-substituted polyalkadiene dienophiles can be readily modified to the desired molecular weight range by conventional chain extension techniques, as by contacting the polyalkadiene prepolymer with a polyfunctional organic chain extender with thorough mixing, desirably followed by degassing. Chain extending reaction conditions are wellknown in the art and will not be discussed here in great detail. As an example of such reaction conditions, the chain extension of a dihydroxy polyalkadiene prepolymer with a diisocyanate chain-extender such as 2,4-toluene diisocyanate is effected at room temperature or at a moderately elevated temperatures. As is well known in the art, the reaction conditions are a function of the materials employed and these conditions can be readily determined by one skilled in the art. The resulting chain-extended polyalkadiene has a substantially increased molecular weight range and, in physical appearance, can be a highly-viscous fluid or solid gum. A full description of the chain extension of reactive substituted polyalkadiene dienophiles, including representative chain extending compounds, is found in Polaski U.S. Pat. No. 3,894,982, particularly from Col. 5, line 16 through Col. 8, line 51, which disclosure is incorporated herein by reference.

The adducts which are used in the practice of the invention are readily prepared by conventional techniques well known in the field of Diels-Alder reactions. In general, the Diels-Alder adduction between the halogenated cyclic diene and the high vinyl dienophiles is effected in an organic solvent such as xylene in relative amounts such that the stoichiometric ratio between the halogenated cyclic conjugated diene and the double bonds of the dienophile is in the range of 0.01 to 1. The mixture is heated at temperatures in the range from 100° C. to 200° C. Within this temperature range, the adduction reaction is exothermic and yields are quite often quantitative. The reaction is continued for a time sufficient to substantially react the halogenated cyclic conjugated diene and the high vinyl dienophile to provide an adduct having a halogen content in the range from about 20 to 40, preferably about 26 to 35, percent by weight based on the total weight of the adduct. The halogen content of the adduct can be determined by known analytical procedures, such as Schoniger combustion.

The Diels-Alder adducts of the present invention are also described in detail in U.S. Pat. No. 4,795,778 which is incorporated herein by reference. The Diels-Alder adduct of the present invention is typically utilized in an amount ranging from about 35 to 75, preferably from about 45 to 65, percent by dry weight (excluding solvent) of the total adhesive composition.

The phenolic resin of the present invention can essentially be any heat-reactive phenolic resin. Typical phenolic resins include the organic solvent-soluble heat-reactive condensation product of an aldehyde having from 1 to 8 carbon atoms, such as formaldehyde, acetaldehyde, isobutyraldehyde, ethylhexaldehyde, and the like, with phenolic compounds such as phenol, o-cresol, m-cresol, p-cresol, mixed cresols, e.g., cresylic acid and m-cresol and/or p-cresol, xylenol, diphenylolproprane, p-butylphenol, p-phenylphenol, p-chlorophenol, o-chlorophenol, m-bromophenol, 2-ethylphenol, p-alkoxyphenol, nonyl phenol, p-tert-amylphenol, p-octylphenol, p,p'-dihydroxydiphenylether, and the like. Mixtures of dissimilar phenolic resins can also be used.

The phenolic resin will preferably be formed in a conventional manner from the condensation of from about 0.8 to about 5 moles of aldehyde per mole of phenolic compound in the presence of basic, neutral, or acidic catalysts to afford an organic solvent-soluble resin having a molecular weight in the range of from about 300 to about 2,000, preferably from about 300 to about 1,200. A particularly preferred phenolic resin is prepared by reacting formaldehyde and phenol to create a phenol formaldehyde resin having a methylol content ranging from about 10 to 60, preferably about 30 to 50 percent. The phenolic resin is typically employed in an amount ranging from about 1 to 15, preferably about 3 to 8, percent by dry weight of the adhesive composition.

The aromatic hydroxy compound of the present invention can be essentially any aromatic compound having one, two or three hydroxy substituents. The aromatic compound is preferably benzene, and the other non-hydroxy substituents on the benzene ring or other aromatic compound may be hydrogen, alkyl, aryl, alkylaryl, arylalkyl carboxy, alkoxy, amide, imide, halogen or the like. The non-hydroxy substituents are most preferably hydrogen and, if alkyl, are preferably lower alkyls having from one to 10 carbon atoms including methyl, ethyl, propyl, amyl, and nonyl. Representative monohydroxy compounds include phenol, p-t-butyl phenol, p-phenylphenol, p-chloro-phenol, p-alkoxyphenol, o-cresol, m-cresol, o-chlorophenol, m-bromophenol, 2-ethylphenol, amyl phenol, and nonyl phenol, with phenol, p-t-butyl phenol and nonyl phenol being preferred monohydroxy aromatic compounds. Representative dihydroxy compounds include resorcinol, hydroquinone and catechol with resorcinol being the preferred dihydroxy aromatic compound. Representative trihydroxy compounds include pyrogallol, gallates such as propyl gallate, robinetin, baptigenin and anthragallol, with pyrogallol being the preferred trihydroxy aromatic compound. It is presently preferred to utilize resorcinol as the aromatic hydroxy compound of the invention. The aromatic hydroxy compound is typically utilized in the invention in an amount ranging from about 1 to 15, preferably from about 7 to 11, percent by dry weight of the adhesive composition.

The formaldehyde donor of the invention can essentially be any type of formaldehyde or formaldehyde source known to react with hydroxy aromatic compounds to form phenolic resins. Typical compounds useful as a formaldehyde donor in the present invention include formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexaldehyde; benzaldehyde; as well as compounds which decompose to formaldehyde, such as paraformaldehyde, trioxane, furfural, hexamethylenetetramine; acetals which liberate formaldehyde on heating; and the like. It is presently preferred to utilize hexamethylenetetramine as the formaldehyde donor of the invention. The formaldehyde donor is utilized in an amount ranging from about 1 to 15, preferably from about 8 to 12, percent by dry weight of the adhesive composition.

The heat-activated unsaturated elastomer crosslinker of the present invention can be any of the commonly known crosslinkers, such as quinone dioxime, dibenzoquinone dioxime, and 1,2,4,5-tetrachlorobenzoquinone. The crosslinker is typically employed in an amount ranging from about 0.1 to 15, preferably 1 to 4, percent by dry weight of the adhesive composition.

The vulcanizing agent of the present invention can be any known vulcanizing agent which is capable of crosslinking elastomers at molding temperatures (140°-200° C.). Preferred vulcanizing agents for use in the invention are selenium, sulphur, and tellurium, especially selenium. The vulcanizing agent is utilized in the present invention in an amount ranging from about 1 to 15, preferably from about 2 to 7, percent by dry weight of the adhesive composition.

The metal oxide can be any known metal oxide such as zinc oxide, magnesium oxide, litharge, red lead, and combinations thereof, with zinc oxide being the preferred metal oxide since it is unusually effective and environmentally more acceptable than the lead-containing alternatives. The metal oxide is typically utilized in an amount ranging from about 1 to 60, preferably from about 10 to 20, percent by dry weight of the adhesive composition.

The present adhesive composition can optionally contain other wellkown additives including plasticizers, fillers, pigments, reinforcing agents and the like, in amounts employed by those skilled in the adhesive arts to obtain the desired color and consistency. Typical additional additives include fumed silica, carbon black, and titanium dioxide. It is particularly preferred in the present invention to use fumed silica and carbon black in order to pigment, reinforce, and control the rheology of the adhesive. The fumed silica is typically employed in an amount ranging from about 0.5 to 5, preferably about 1 to 3, percent by dry weight of the total adhesive composition, while the carbon black is typically employed in an amount ranging from about 3 to 50, preferably about 8 to 15, percent by dry weight of the total adhesive composition.

In order to prepare the adhesive composition of the invention, the above ingredients are typically combined, dissolved, and dispersed in an appropriate solvent. Typical solvents useful in the invention include aromatic hydrocarbons such as xylene, toluene, and polar solvents such as ketones, including methylisobutyl ketone, and methyl ethyl ketone. The solvent is typically utilized in an amount sufficient to create an adhesive formulation having a viscosity in the range from 25 to 5000, preferably 100 to 700, centipoises at a total solids content (TSC) in the range from about 5 to 40, preferably about 10 to 35, percent.

The present adhesive composition may also be prepared as an aqueous formulation by adding typical aqueous surfactants such as aryl alkyl ethoxylates, adding water under high shear conditions to form the emulsion, and vacuum stripping the solvent as is known in the art.

The adhesive composition of the invention is preferably utilized to bond an elastomeric material to a metal surface under heat and pressure. The composition may be applied to the metal surface by spraying, dipping, brushing, wiping, or the like, after which the composition is allowed to dry. The coated metal surface and the elastomeric substrate are typically brought together under a pressure of from about 20.7 to 172.4 Mega Pascals (MPa), preferably from about 20 MPa to 50 MPa. The resulting rubbermetal assembly is simultaneously heated to a temperature from about 140° C. to about 200° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. As stated above, the adhesive compositions of the present invention are particularly suitable for use in injection molding processes. The process may also be carried out by utilizing compression molding, transfer molding or autoclave curing techniques. After the process is complete, the bond is fully vulcanized and ready for use in a final application.

Although the adhesives of the present invention are preferred for bonding elastomeric materials to metal, the present adhesive compositions may be applied as an adhesive, primer or coating to any surface or substrate capable of receiving the adhesive. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The material is preferably natural rubber, or styrene-butadiene rubber. The surface to which the material is bonded can be any surface such as a glass, plastic or fabric surface capable of receiving the adhesive and is preferably a metal surface selected from any of the common structural metals such as iron, steel (including stainless steel), lead, aluminum, copper, brass, bronze, Monel metal, nickel, zinc, and the like.

The description given above and the following examples are provided for purposes of disclosing and illustrating the invention and the specific amounts and combinations of ingredients set forth therein are not intended to limit the scope of the invention which is defined by the claims.

EXAMPLES 1 and 2

An adduct of hexachlorocyclopentadiene and 1,2-polybutadiene is prepared by reacting 79.8 gms of hexachlorocyclopentadiene, 201.5 gms of 1,2-polybutadiene (vinyl content 92%, crystallinity 25%, MW 95,000), and 718.7 gms of xylene at 142° C. for 20 hours. This yields an adduct containing between 27 and 29 percent chlorine. The adduct is then precipitated into methanol, dried, and redissovled in a 2/1 methylisobutyl ketone/xylene blend three times to remove unreacted hexachlorocyclopentadiene.

The adduct prepared above is utilized with the following ingredients and solvents to prepare adhesive compositions in accordance with the present invention:

| Ingredient | Amount (g) | |
| --- | --- | --- |
| | Example 1 | Example 2 |
| Hexachlorocyclopentadiene/1,2-polybutadiene adduct | 14.5 | 14.5 |
| Zinc oxide | 4.0 | 2.0 |
| Fumed Silica[a] | 0.5 | 0.5 |
| Quinone Dioxime | 0.6 | 0.6 |
| Hexamethylenetetramine | 2.8 | 2.8 |
| Resorcinol | 2.4 | 2.4 |
| N-762 Carbon Black | 3.0 | 3.0 |
| Selenium | 1.2 | 1.2 |
| Phenolic Resin[b] | 2.1 | 0.9 |
| Methylisobutyl ketone | 44.8 | 42.0 |
| Xylene | 46.1 | 40.5 |

[a]CAB-O-SIL HS-5 (Cabot Corp.)
[b]Phenol formaldehyde resin (37% methylol content, 70% TSC in 3:1 methylethyl ketone:ethanol solvent).

Adhesion Tests

The adhesive compositions prepared above in Examples 1 and 2 are coated onto grit-blasted steel coupons at a film thickness of 0.5 to 1.2 mils. The coated coupons are bonded to E-218 (55–60 durometer Shore A semi-EV cure natural rubber), HC-202 (60–65 durometer Shore A styrene butadiene rubber), and A060P (40–45 durometer Shore A natural rubber) substrates by injection molding the rubber onto the coated coupons at 330° F., and then vulcanizing the rubber at 330° F. for 7 minutes, 15 minutes, and 8 minutes, respectively. The bonded rubber-metal assemblies are then subjected to the tests described below.

Primary Adhesion

Bonded parts are pulled to destruction according to ASTM test method D429B. Parts are tested in peel with a peel angle of 45 degrees. The test is conducted at room temperature with a test speed of 20 inches per minute. After the bonded part fails, the peak peel strength value (measured in pounds) and the percent rubber retention on the adhesive coated area of the part are measured.

72-Hour Salt Spray

Bonded parts are buffed on the edges with a grinding wheel. The rubber is then tied back over the metal with stainless steel wire. This exposes the bondline to the environment. Failure is initiated by scoring the bondline with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 72 hours. Upon removal, the rubber is peeled from the metal with pliers. The percent rubber retention on the part is then measured.

Two-Hour Boiling Water

Bonded parts are prepared the same way as they are for the salt spray test; however, in this test, the parts are placed in a beaker filled with boiling tap water. The parts remain in this environment for 2 hours. Upon removal, the rubber is peeled from the metal with pliers. The percent rubber retention on the part is then measured.

100-Hour 300° F. Exposure to 70/30 Ethylene Glycol/H₂O Mixture

Bonded parts are prepared the same way as they are for the salt spray test. In this test, the parts are placed in a can filled with a solution containing 70 percent (by weight) ethylene glycol and 30 percent water. The can containing the parts is then heated to 300° F. for 100 hours. Upon removal, the rubber is peeled from the metal with pliers. The percent rubber retention on the part is then measured.

Seven-Day Room Temperature Water-Immersion

Bonded parts are prepared the same way as they are for the salt spray test. In this test, the parts are placed in a beaker filled with tap water which is at room temperature. The parts remain in this environment for seven days. Upon removal, the rubber is peeled from the metal with pliers. The percent rubber retention on the part is then measured.

275° F. Hot-Tear Resistance

Testing is very similar to primary adhesion. The only difference is that, in this test, bonded parts are placed in a chamber heated to 275° F. for 15 minutes. Following this, they are tested at 275° F. The peel angle and test specifications are identical to those used for primary adhesion. Peak peel strength and percent rubber retention are recorded.

The results of the above tests are set forth in Table 1 below. In the data, reference is made to failure in the rubber body (R), failure between the adhesive composition and the rubber (RC), and failure between the adhesive composition and metal substrate (CM). Failure is expressed in terms of percent, and a high percent of failure in the rubber is desirable since this indicates that the adhesive bond is stronger than the rubber itself. Prebake time refers to the amount of time the coated coupon is subjected to the bonding temperature of 330° F. prior to bonding with the rubber.

TABLE 1

| Test | Prebake Time | Failure Mode (Ex. 1) | Failure Mode (Ex. 2) |
| --- | --- | --- | --- |
| E218 Substrate | | | |
| Primary Adhesion | 0' | 100R | 100R |
| (7 min. cure) | 3' | 100R | 100R |
| | 6' | 100R | 100R |
| 72-Hr. Salt Spray | 0' | 85R, 15RC | 85R, 15RC |
| | 3' | 67R, 33RC | 74R, 26RC |
| | 6' | 90R, 10RC | 98R, 2RC |
| 2-Hr. Boiling Water | 0' | 100R | 100R |
| | 3' | 95R, 4RC, 1CM | 72R, 11RC, 17CM |
| | 6' | 65R, 25RC, 10CM | 80R, 18RC, 2CM |
| 100-Hr./300° F. Exposure to 70/30 Ethylene Glycol/H₂O | 0' | 72R, 28RC | 92R, 8RC |
| | 3' | 95R, 5RC | 79R, 21RC |
| | 6' | 87R, 13RC | 90R, 10RC |
| 7-Day RT Water Immersion | 0' | 90R, 10CM | 97R, 3CM |
| | 3' | 96R, 4CM | 91R, 9CM |
| | 6' | 95R, 5CM | 88R, 12CM |
| 275° F. Hot-Tear Resistance | 0' | 100R | 100R |
| | 3' | 100R | 100R |
| | 6' | 100R | 100R |
| HC202 Substrate | | | |
| Primary Adhesion | 0' | 100R | 100R |
| (15 min. cure) | 3' | 97R, 3RC | 82R, 18RC |
| | 6' | 2R, 98RC | 1R, 99RC |
| A060P Substrate | | | |
| Primary Adhesion | 0' | 100R | 100R |
| (8 min. cure) | 3' | 100R | 92R, 8RC |
| | 6' | 100R | 90R, 10RC |

As can be seen from the above data, the predominately non-toxic adhesive compositions of the present invention can be applied as a one-coat system which will withstand the demanding bonding conditions of an injection molding process. Furthermore, the adhesive bond so produced is capable of resisting high temperature fluids (ethylene glycol/water) and corrosive agents (salt spray).

What is claimed is:

1. An adhesive composition comprising:
   a) a Diels-Alder adduct of a perhalogenated cyclic conjugated diene and an olefinically unsaturated dienophile having a vinyl content in excess of 50 percent;
   b) a phenolic resin;
   c) an aromatic hydroxy compound;
   d) a formaldehyde donor;
   e) a heat-activated unsaturated elastomer crosslinker;
   f) a vulcanizing agent; and
   g) a metal oxide.

2. An adhesive composition according to claim 1 wherein the cyclic conjugated diene is selected from the group consisting of hexachlorocyclopentadiene, hexafluorocyclopentadiene, hexabromocyclopentadiene, 5,5-difluorotetrachlorocyclopentadiene and 5,5-dibromotetrachlorocyclopentadiene.

3. An adhesive composition according to claim 2 wherein the cyclic conjugated diene is hexachlorocyclopentadiene.

4. An adhesive composition according to claim 1 wherein the dienophile is a polymeric material selected from the group consisting of polyalkadienes, hydroxyl-terminated polyalkadienes, chain-extended hydroxyl-terminated polyalkadienes, carboxyl-terminated polyalkadienes, chain-extended carboxyl-terminated polyalkadienes, mercaptanterminated polyalkadienes, chain-extended mercaptan-terminated polyalkadienes, amine-terminated polyalkadienes, chain-extended amineterminated polyalkadienes, and their equivalents.

5. An adhesive composition according to claim 4 wherein the dienophile is 1,2-polybutadiene.

6. An adhesive composition according to claim 1 wherein the Diels-Alder adduct has a halogen content between about 20 and 40 percent.

7. An adhesive composition according to claim 6 wherein the Diels-Alder adduct has a halogen content between about 26 and 35 percent.

8. An adhesive composition according to claim 1 wherein the Diels-Alder adduct has a vinyl content between about 70 and 98 percent.

9. An adhesive composition according to claim 8 wherein the Diels-Alder adduct has a vinyl content between about 80 and 98 percent.

10. An adhesive composition according to claim 1 wherein the phenolic resin is the condensation product of an aldehyde having from 1 to 8 carbon atoms and a phenolic compound.

11. An adhesive composition according to claim 10 wherein the phenolic resin is the condensation product of phenol and formaldehyde.

12. An adhesive composition according to claim 1 wherein the aromatic hydroxy compound is selected from the group consisting of resorcinol, phenol, p-t-butyl phenol, p-phenylphenol, p-chlorophenol, p-alkoxyphenol, o-cresol, m-cresol, o-chlorophenol, m-bromophenol, 2-ethylphenol, amyl phenol, nonyl phenol, hydroquinone, catechol, pyrogallol, gallates such as propyl gallate, robinetin, baptigenin and anthragallol.

13. An adhesive composition according to claim 12 wherein the aromatic hydroxy compound is resorcinol.

14. An adhesive composition according to claim 1 wherein the formaldehyde donor is selected from the group consisting of formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexaldehyde; benzaldehyde; compounds which decompose to formaldehyde, such as paraformaldehyde, trioxane, furfural, and hexamethylenetetramine; and acetals which liberate formaldehyde on heating.

15. An adhesive composition according to claim 14 wherein the formaldehyde donor is hexamethylenetetramine.

16. An adhesive composition according to claim 1 wherein the heat-activated unsaturated elastomer crosslinker is selected from the group consisting of quinone dioxime, dibenzoquinone dioxime, and 1,2,4,5-tetrachlorobenzoquinone.

17. An adhesive composition according to claim 16 wherein the heat-activated unsaturated elastomer crosslinker is quinone dioxime.

18. An adhesive composition according to claim 1 wherein the vulcanizing agent is selected from the group consisting of selenium, sulfur, and tellurium.

19. An adhesive composition according to claim 18 wherein the vulcanizing agent is selenium.

20. An adhesive composition according to claim 1 wherein the metal oxide is selected from the group consisting of zinc oxide, magnesium oxide, litharge, red lead, and combinations thereof.

21. An adhesive composition according to claim 20 wherein the metal oxide is zinc oxide.

22. An adhesive composition comprising from about 35 to 75 percent by dry weight of a Diels-Alder adduct of a perhalogenated cyclic conjugated diene and an olefinically unsaturated dienophile having a vinyl content in excess of 50 percent, from about 1 to 15 percent by dry weight of a phenolic resin, from about 1 to 15 percent by dry weight of an aromatic hydroxy compound, from about 1 to 15 percent by dry weight of a formaldehyde donor, from about 0.1 to 15 percent by dry weight of a heatactivated unsaturated elastomer crosslinker, from about 1 to 15 percent by dry weight of a vulcanizing agent, and from about 1 to 60 percent by dry weight of a metal oxide.

23. An adhesive composition according to claim 22 wherein the Diels-Alder adduct is derived from hexachlorocyclopentadiene and 1,2-polybutadiene and is present in an amount from about 45 to 65 percent by dry weight, the phenolic resin is the condensation product of phenol and formaldehyde and is present in an amount from about 3 to 8 percent by dry weight, the aromatic hydroxy compound is resorcinol and is present in an amount from about 7 to 11 percent by dry weight, the formaldehyde donor is hexamethylenetetramine and is present in an amount from about 8 to 12 percent by dry weight, the heat-activated unsaturated elastomer crosslinker is quinone dioxime and is present in an amount from about 1 to 4 percent by dry weight, the vulcanizing agent is selenium and is present in an amount from about 2 to 7 percent by dry weight, and the metal oxide is zinc oxide and is present in an amount from about 10 to 20 percent by dry weight.

24. An adhesive composition according to claim 23 wherein the 1,2-polybutadiene has a vinyl content in excess of 90 percent, a molecular weight between 35,000 and 40,000 and a crystallinity between 23 and 27 percent.

25. An adhesive composition according to claim 23 further comprising fumed silica and carbon black present in amounts ranging from about 0.5 to 5 and about 3 to 50 percent by dry weight, respectively, of the total adhesive composition.

26. An adhesive composition according to claim 25 wherein the amounts of silica and carbon black range from about 1 to 3 and about 8 to 15 percent by dry weight, respectively.

27. A method of bonding two materials comprising applying the adhesive composition of claim 1 between the two materials under heat and pressure.

28. A method according to claim 27 wherein the two materials comprise a metal surface and an elastomeric substrate.

29. An elastomer-to-metal assembly prepared according to the method of claim 28.

* * * * *